April 4, 1950 R. B. SHANCK 2,503,000
CARRIER TELEGRAPHY
Filed Dec. 23, 1947
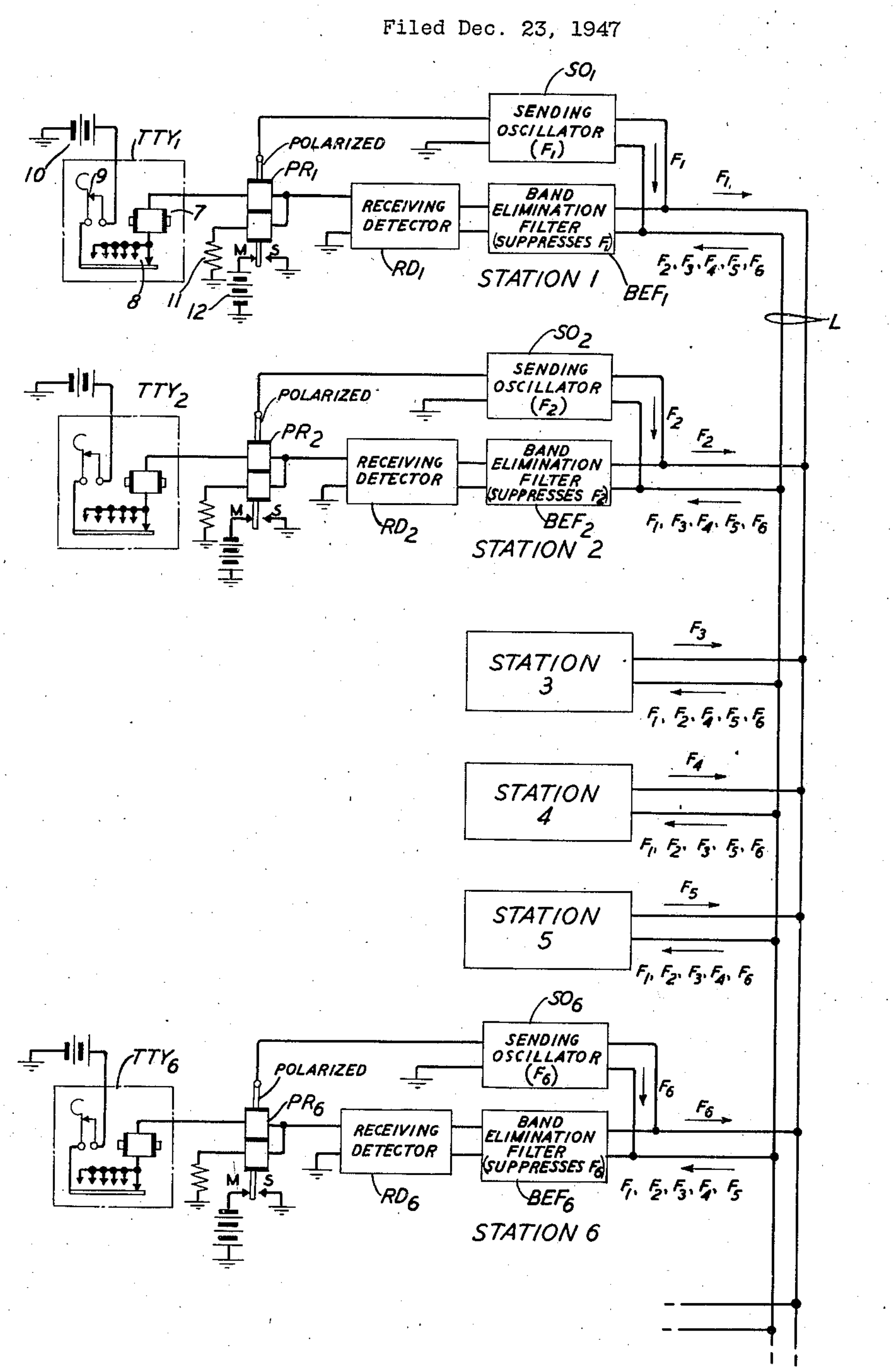
INVENTOR
R. B. SHANCK
BY
Earl C. Laughlin
ATTORNEY

UNITED STATES PATENT OFFICE 2,503,000

CARRIER TELEGRAPHY

Roy B. Shanck, Douglaston, N. Y., assignor to Bell Telephone Laboratories, Incorporated, New York, N. Y., a corporation of New York Application December 23, 1947, Serial No. 793,555

3 Claims. (Cl. 178—2)

The invention relates to two-way carrier wave signaling systems and particularly to two-way carrier telegraph systems.

The invention is specifically applicable to a system operating to provide two-way carrier telegraph communication between a number of stations located at different points over a common two-wire circuit, such as a telephone line. Difficulty has been experienced in the operation of such multipoint systems due to echo effects. Such difficulties have been obviated in prior art carrier telegraph systems of this type by the provision of means at each station for desensitizing or disabling the signal receiving equipment while outgoing signals are being transmitted from the station and for a short time interval thereafter, so as to prevent false operation of this equipment by the portion of the outgoing signals or echoes thereof diverted into the receiving circuit at the common point of connection of the signal transmitting and receiving circuits to the common line. This method, of course, has disadvantages in that it results in lockout or loss of any incoming signals received at the sending station over the common line from other stations during the period of desensitization or disablement of the receiving equipment at the first station, and prevents another station from breaking-in during this time interval.

An object of the invention is to improve such multipoint carrier telegraph systems.

Other objects are to reduce the effects of sender echoes; to prevent transmission lockouts; and to facilitate break-in by any station in such a multipoint carrier telegraph system when another station is transmitting signals.

In the improved multipoint carrier telegraph system in accordance with the invention, the carrier transmitters of a considerable number of two-way carrier telegraph stations connected over a common two-way line, operate on respectively different carrier frequencies, and the receiving circuit of each station includes means, such as a band elimination filter, in its input for suppressing the portion of the outgoing signals or echoes thereof diverted into that circuit from the receiving transmitting equipment of the station while allowing substantially free transmission thereto of the carrier signals of different frequencies incoming over the line from all of the other stations. Thus, when any station is sending, false operation of the receiving equipment of that station either directly in response to the transmitted signals or by talker echoes is prevented, and any receiving station can break in at any time to transmit its carrier signals to the receiving equipment of the first station.

The various objects and features of the invention are brought out more clearly in the following complete description to be read in conjunction with the accompanying drawing, the single figure of which shows schematically a multipoint carrier telegraph system embodying the invention.

In the system of the invention as shown in the drawing, a plurality of subscriber carrier telegraph stations 1, 2, 3, 4, 5, 6 . . . are connected to the two-wire line L at different points. Station 1, as indicated, includes the sending oscillator $SO_1$ designed to generate carrier oscillation of the frequency $F_1$, which may be of any suitable type, having its output connected directly across the line L, and the receiving wave detector $RD_1$ having its input connected across the line L through a band elimination filter $BEF_1$ designed to suppress applied waves of frequency corresponding to the transmitting frequency $F_1$ assigned to station 1 and to provide substantially free transmission of the carrier waves of the frequencies transmitted by all the other stations, 2, 3, 4, 5, 6 . . . , to the receiving detector $RD_1$. The station may include any suitable source of outgoing telegraph signals for keying the sending oscillator $SO_1$ and any suitable telegraph signal receiving equipment controlled from the output of the detector $RD_1$, for example, teletypewriter transmitting and receiving equipment of the type disclosed in the United States Patent 1,904,164, issued on April 18, 1933, to S. Morton et al. The subscriber teletypewriter equipment $TTY_1$, as illustrated diagrammatically, may include a neutral receiving relay or device 7, which may be the selector magnet of a printing telegraph recorder such as is disclosed in the aforementioned Morton et al. patent; a transmitting device including transmitting contacts 8; and a break key 9 all of which are connected in a direct current or local telegraph circuit, shown as a conventional balanced loop circuit, in series with the battery 10 and the resistor 11 across the two series windings of the polar relay $PR_1$. One output terminal of the receiving detector $RD_1$ is connected to a point between the two series windings of polar relay $PR_1$ and the other output terminal to ground. In the idle condition of the station, that is, when no outgoing telegraph signals are being transmitted, the armature of relay $PR_1$ is held on its marking contacts M to connect biasing battery 12 to the sending oscillator $SO_1$ in such manner as to bias it to the unoperated condition.

Each of the other subscriber stations 2, 3, 4, 5, 6 . . . comprises equipment identical with that of station 1 as described above, as indicated by the use of similar identification characters for the component elements except for the addition of a subscript identifying it with the particular station (see stations 2 and 6 illustrated in detail), except that the respective sending oscillators $SO_2$, $SO_3$, $SO_4$, $SO_5$, $SO_6$ . . . in these stations are designed to generate carrier oscillations of the different respective frequencies $F_2$, $F_3$, $F_4$, $F_5$, $F_6$ . . . , and the band-elimination filter $BEF_2$, $BEF_3$, $BEF_4$, $BEF_5$, $BEF_6$ . . . in the input of the receiving circuit of each station is respectively designed to suppress applied waves of frequency corresponding to the transmitting frequency, $F_2$, $F_3$, $F_4$, $F_5$, or $F_6$ . . . assigned respectively to these stations and to provide substantially free transmission of the carrier waves of the frequencies transmitted by all the other stations to the associated receiving detector.

The transmitting contacts 8 in the teletypewriter equipment $TTY_1$, $TTY_2$ . . . at each of the stations 1, 2 . . . may be controlled by a keyboard mechanism such as disclosed in the aforementioned Morton et al. patent to control the associated polar relay $PR_1$, $PR_2$ . . . of the station in accordance with permutation code signals representing a telegraph message. With the break key 9 closed and the transmitting contacts 8 of the teletypewriter equipment at a station in the rest or idle condition indicated, which is a marking condition, the windings of the associated polar relay $PR_1$, $PR_2$ . . . are operatively energized from the associated battery 10 to hold the armature of that relay on its marking "M" contact. When the break key 9 or the associated circuit is open the armature of the associated polar relay $PR_1$, $PR_2$ . . . is returned to the spacing "S" contact. The operation of the armature of the polar relay $PR_1$, $PR_2$ . . . to the marking contact connects the biasing battery 12 to the associated sending oscillator $SO_1$, $SO_2$ . . . in such manner as to bias it to the unoperated condition so that no carrier oscillations are transmitted to the line L; and each operation of the armature of this relay to the spacing contact will remove the biasing battery to key the associated oscillator $SO_1$, $SO_2$ . . . so that it transmits a train of carrier oscillations of the assigned frequency $F_1$, $F_2$ . . . of the station, representing a spacing telegraph signal out over the line L.

It will be assumed that the subscriber at station 1 is operating the keyboard of his teletypewriter equipment $TTY_1$ so as to alternately shift the armature of the polar relay $PR_1$ from the marking to the spacing contact in accordance with the permutation code signals of a telegraph message, causing the sending oscillator $SO_1$ to be keyed periodically so as to send out over the line L trains of carrier oscillations of the frequency $F_1$ representing the telegraph message. Any portion of these outgoing carrier signals, or echoes thereof, entering the receiving circuit of station 1 at its point of connection to the line L will be prevented from reaching the receiving detector $RD_1$ and causing false operation thereof by the band filter $BEF_1$ in the input of that detector, which is designed to suppress waves of the frequency $F_1$.

The carrier signals of the frequency $F_1$ incoming over the line L will pass through the band elimination filter $BEF_2$, $BEF_3$ . . . $BEF_6$ in the receiving circuit of each of the other stations 2 . . . 6, the pass ranges of which include the frequency $F_1$, and will be detected by the receiving detector in the output thereof, and the detected signals will be supplied through the upper winding of the associated polar relay to the selector relay 7 in the teletypewriter equipment at each station controlling the latter relay in accordance with the incoming telegraph message.

Now, let it be assumed that while station 1 continues to send out carrier signals of the frequency $F_1$ over the line L, the subscriber at another station, say, station 6, desires to break in. He will operate his break key 9 and the teletypewriter equipment $TTY_6$, which, in the manner described above in connection with the similar equipment at station 1, will cause the keying of the sending oscillator $SO_6$ so that it sends out trains of carrier oscillations of the frequency $F_6$ representing his telegraph message over the line L to all the other stations. At station 1, the carrier spacing signals of frequency $F_6$ will be transmitted through the band elimination filter $BEF_1$, the pass range of which includes that frequency, and will be detected by the receiving detector $RD_1$ in its output. Equal portions of the direct current signal output of the receiving detector $RD_1$ will pass in opposite directions through the upper and lower windings of the polar relay $PR_1$ so that they will have no resultant effect on the armature of that relay. The portion of the detected signals passing through the upper winding of the polar relay $PR_1$ will be supplied to the selector relay 7 of the teletypewriter equipment $TTY_1$, and will control that relay in accordance with the break or spacing signals from station 6. Similarly, the receiving selector magnet 7 in the teletypewriter equipment at each of the other stations 3 to 6 will be controlled in accordance with the signals from station 6.

In the manner described, to-and-fro carrier telegraph communication between all the carrier telegraph stations over the single line L can be obtained without appreciable transmission lock-outs and without danger of false operation of the receiving equipment at the stations by talker echoes.

With 170-cycle spacing between carriers, which is standard in the Bell System, such a multipoint carrier telegraph system may be operated with as many as seventeen or eighteen stations on broad-band facilities and with about fourteen on the narrower band type C carrier telephone facilities. A narrower spacing, such as 120 cycles, could be used for ordinary speeds and allow the use of almost 50 per cent more stations on any one circuit. Except when transmitting with either the highest or lowest carrier frequency, each receiving station would receive signals through a fairly wide frequency band so that the wave shape would be nearly rectangular. Only one receiving station would be operated by an appreciably rounded wave in case the highest or lowest carrier frequency were used. Therefore, the effects of normal attenuation changes would be reduced materially in such a system as compared to those in the system employing rounded wave shapes.

Various modifications of the circuits illustrated and described which are within the spirit and scope of the invention will occur to persons skilled in the art.

What is claimed is:

1. A carrier telegraph communication system comprising a transmission line and a plurality of subscriber stations connected to said line at different points, each of said stations including means for sending out trains of carrier oscillations of a frequency which is different for each station, representing telegraph signals over said line to the other stations and receiving means responsive to the telegraph signal-representing carrier oscillations of other frequencies incoming over said line from all of the other stations, but substantially unresponsive to applied carrier oscillations of the frequency transmitted from the local station, or echoes thereof.

2. A carrier telegraph communication system comprising a transmission line and a plurality of subscriber stations connected to said line at different points, each of said stations including a source of carrier oscillations of a frequency which is different for each station, connected to said line, means to key said carrier source in accordance with telegraph signals so that it transmits trains of carrier oscillations representing said signals out over said line to the other stations, telegraph signal receiving means responsive to the carrier signals of other frequencies incoming over said line and means to prevent false operation of said telegraph signal receiving means in response to the carrier signals transmitted from the station, or echoes thereof, comprising filtering means connected between said line and said telegraph signal receiving means, designed to provide substantial attenuation in applied waves of the frequency of said transmitted carrier signals and substantially negligible attenuation to applied waves of frequencies corresponding to those of the carrier signals transmitted from all the other stations.

3. A multipoint carrier telegraph communication system comprising a two-wire transmission line and a plurality of subscriber stations connected to said line at different points, each station comprising a sending oscillator adapted to generate carrier oscillations of a frequency which is different for each subscriber station, feeding into said line, transmitting means for keying said sending oscillator in accordance with signals to be transmitted so that it transmits trains of carrier oscillations of the frequency assigned to the station, representing said signals out over said line to the other stations, a wave detector connected to said line for detecting the carrier signals of other frequencies incoming over said line from all of said other stations, telegraph receiving means responsive to the detected signal output of said detector and a band elimination filter connected between said line and said wave detector, designed to prevent waves of the frequency of the carrier signals transmitted from said station from reaching said detector while allowing substantially free transmission thereto of the carrier signals of the different frequencies incoming over said line from all of the other stations.

ROY B. SHANCK.

REFERENCES CITED

The following references are of record in the file of this patent:

UNITED STATES PATENTS

| Number | Name | Date |
|---|---|---|
| 1,816,904 | Horton | Aug. 4, 1931 |
| 2,047,900 | Bruckel | July 14, 1936 |
| 2,393,021 | Cheek | Jan. 14, 1946 |